(12) United States Patent
Haldankar

(10) Patent No.: US 6,387,167 B1
(45) Date of Patent: May 14, 2002

(54) INK COMPOSITIONS

(75) Inventor: Gautam S. Haldankar, Frankfort, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 09/920,579

(22) Filed: Aug. 1, 2001

Related U.S. Application Data

(62) Division of application No. 09/425,553, filed on Jan. 20, 2000, now Pat. No. 6,326,449, which is a continuation of application No. 08/934,911, filed on Sep. 22, 1997, now Pat. No. 5,998,535.

(51) Int. Cl.⁷ .............................................. C09D 11/10
(52) U.S. Cl. ................. 106/31.59; 106/31.89; 523/160
(58) Field of Search ....................... 523/160; 106/31.59, 106/31.89; 526/310

(56) References Cited

U.S. PATENT DOCUMENTS 4,512,860 A * 4/1985 Abbey et al.
4,740,546 A * 4/1988 Masuda et al.

* cited by examiner

Primary Examiner—Tae H. Yoon
(74) Attorney, Agent, or Firm—Vivien Y. Tsang; Robert E. McDonald; Paul R. Katterle

(57) ABSTRACT

An ink composition, said ink composition comprising:
(a) from about 10% to about 40% by weight styrene; and
(b) from about 10% to about 55% by weight of at least one alkyl methacrylate monomer having 1 to 8 carbon atoms in the alkyl group; and
(c) from about 10% to about 55% by weight of at least one alkyl methacrylate monomer having greater than 8 carbon atoms in the alkyl group; and
(d) from about 5% to about 25% by weight of at least one alkyl acrylate monomer having from 1 to 18 carbon atoms in the alkyl group; and
(e) from about 7% to about 25% by weight of at least one hydroxy-functional ethylenically unsaturated monomer having a molecular weight of less than 2000; and
(f) from about 0.1% to about 15% of a compound providing an amine functional moiety, said compound being an acrylate or methacrylate compound containing amino groups, copolymerizable with (a), (b), (c), (d), and (e); wherein the dispersant is substantially free of acid functionality.

9 Claims, No Drawings

INK COMPOSITIONS

This application is a division of U.S. Ser. No. 09/425,553 filed Jan. 20, 2000, now U.S. Pat. No. 6,326,449 which is a continuation of U.S. Ser. No. 08/934,911 filed Sep. 22, 1997, now U.S. Pat. No. 5,998,535.

FIELD OF THE INVENTION

This invention is directed to polymeric dispersant resins that are useful in the manufacture of resin-containing pigment dispersions and surface coating compositions, and to pigment dispersions and surface-coating compositions that contain these dispersants. It further relates to polymer dispersant resins that are compatible with a wide variety of resin systems and film-forming polymers. This invention also relates to the use of this dispersant resin in compatibilizing at least two polymers, wherein at least two polymers are incompatible. This invention also relates to polymer blends that are compatibilized using the dispersant resin of this invention. Due to the novel composition and molecular weight of the polymeric dispersants, they are especially suited for use in high solids compositions. This invention further relates to ink compositions.

BACKGROUND OF THE INVENTION

To be useful as a multipurpose dispersant with wide compatibility in pigment and coating dispersions, the dispersant should be compatible with the acrylic, polyester, alkyd, epoxy resin, polyurethane, and other film-forming resins that are commonly used in surface coating compositions. It should also be able to disperse both organic and inorganic pigments. It should also enhance the tint strength of the pigments, improve gloss, hiding power, and stability of the surface coating composition.

Polymeric dispersants have been known in the art. During coating manufacture, it has been typical to disperse the pigments into only a portion of the total resin vehicle of which the coating composition is comprised, together with appropriate liquid carriers and additives. The resulting dispersion is then mixed with the remainder of the total resin vehicle used in the coating composition. These additions can take place by the ultimate user of the coating composition to adjust color, or they may be used during the actual manufacture of the coating composition itself. However, most pigment dispersions are very specific in their performance and are compatible with only a small number of the diverse solvents and film-forming resins used in coating compositions. A number of polymeric dispersants have been proposed for as multipurpose widely compatible pigment dispersions, but none has proven to be entirely satisfactory. Some do not have the required compatibility with a wide range of the film-forming resins and solvents, or do not have good pigment-wetting characteristics, while others adversely affect the properties of the surface-coating compositions or increase their cost appreciably.

It has now been found that polymeric dispersant resins made from polymerization products of specific monomer units are capable of acting as multipurpose dispersants because they are compatible with a wide range of film-forming resins, as well as capable of dispersing both organic and inorganic pigments. Due to its solvating properties, use of this polymeric dispersant resin reduces the need for solvents typically used for pigment dispersions. Dispersants of this invention can disperse both organic and inorganic pigments wherein the film-forming resin is an acrylic, alkyd, polyester, epoxy resin, polyurethane, or non-aqueous dispersion resin. The dispersants of this invention can also act as a compatibilizer to aid in blending some mutually incompatible polymers (that is, those polymer systems being relatively inmiscible and creating a cloudy appearance upon mixing). The dispersants of this invention are useful in pigment dispersions, inks, and surface-coating resin-containing compositions.

BRIEF SUMMARY OF THE INVENTION

An aspect of this invention is a polymeric dispersant, said dispersant being the polymerization reaction product of a mixture of monomers consisting essentially of:
  (a) from about 10% to about 40% by weight styrene; and
  (b) from about 10% to about 55% by weight of at least one alkyl methacrylate monomer having 1 to 8 carbon atoms in the alkyl group; and
  (c) from about 10% to about 55% by weight of at least one alkyl methacrylate monomer having greater than 8 carbon atoms in the alkyl group; and
  (d) from about 5% to about 25% by weight of at least one alkyl acrylate monomer having from 1 to 18 carbon atoms in the alkyl group; and
  (e) from about 7% to about 25% by weight of at least one hydroxy-functional ethylenically unsaturated monomer having a molecular weight of less than 2000; and
  (f) from about 0.1% to about 15% of a compound providing an amine functional moiety, said compound being an acrylate or methacrylate compound containing amino groups, copolymerizable with (a), (b), (c), (d), and (e); wherein the dispersant is substantially free of acid functionality.

The dispersant of this invention is especially adapted for dispersing pigments therein and being compatible with a variety of alkyd resins, acrylic resins, non-aqueous dispersions, inks, and film-forming polymers.

In another aspect, this invention is a polymeric dispersant that is particularly useful due to its composition and pigment dispersions prepared therefrom. The polymeric dispersants of this invention provide excellent pigment wetting characteristics and stable dispersions. The polymeric dispersants also provide low viscosity dispersions suitable for use in high solids applications. The dispersions of this invention provide higher hiding power (opacity) and tinting strength with pigments, and the dispersions of this invention eliminate or minimize the need for surfactants used in dispersing pigments.

In yet another aspect, this invention is a high solids surface-coating composition comprising the polymeric dispersant resin. The surface coating compositions comprise the polymeric dispersant and other film-forming polymers, optionally in combination with a crosslinker. The surface coating composition may also include a pigment component.

In still yet another aspect, this invention is a process for compatibilizing at least two polymers, wherein at least two polymers are mutually incompatible, said process comprises:
  (i) adding to at least one of the polymers an effective amount of a compatibilizing dispersant, wherein said dispersant is the polymerization reaction product of a mixture of monomers consisting essentially of:
    (a) from about 10% to about 40% by weight styrene; and
    (b) from about 10% to about 55% by weight of at least one alkyl methacrylate monomer having 1 to 8 carbon atoms in the alkyl group; and
    (c) from about 10% to about 55% by weight of at least one alkyl methacrylate monomer having greater than 8 carbon atoms in the alkyl group; and (d) from about 5% to about 25% by weight of at least one alkyl acrylate monomer having from 1 to 18 carbon atoms in the alkyl group; and (e) from about 7% to about 25% by weight of at least one hydroxy-functional ethylenically unsaturated monomer having a molecular weight of less than 2000; and (f) from about 0.1% to about 15% of a compound providing an amine functional moiety, said compound being an acrylate or methacrylate compound containing amino groups, copolymerizable with (a), (b), (c) and (d) and (e); wherein the dispersant is substantially free of acid functionality; and (ii) combining additional polymers to the polymer in step (1); and (iii) blending all polymers until properly compatibilized.

In yet still another aspect, this invention is a compatibilized polymer blend, comprising:

(i) at least two mutually incompatible polymers; and (ii) a compatibilizing dispersant being the polymerization reaction product of a mixture of monomers consisting essentially of:

(a) from about 10% to about 40% by weight styrene; and (b) from about 10% to about 55% by weight of at least one alkyl methacrylate monomer having 1 to 8 carbon atoms in the alkyl group; and (c) from about 10% to about 55% by weight of at least one alkyl methacrylate monomer having greater than 8 carbon atoms in the alkyl group; and (d) from about 5% to about 25% by weight of at least one alkyl acrylate monomer having from 1 to 18 carbon atoms in the alkyl group; and (e) from about 7% to about 25% by weight of at least one hydroxy-functional ethylenically unsaturated monomer having a molecular weight of less than 2000; and (f) from about 0.1% to about 15% of a compound providing an amine functional moiety, said compound being an acrylate or methacrylate compound containing amino groups, copolymerizable with (a), (b), (c), (d), and (e); wherein the dispersant is substantially free of acid functionality; and wherein the dispersant is present in an effective amount to form a compatibilized blend of at least three polymers including said dispersant and said at least two polymers.

These and other objects of this invention will become apparent from the following discussions.

DETAILED DESCRIPTION OF THE INVENTION

The present invention is directed to a polymeric dispersant resin, and to pigment dispersions, surface-coating, and ink compositions containing the dispersant. The polymeric dispersants of this invention have wide compatibility with pigment dispersions and a wide variety of other firm-forming resins such as acrylic polymers, epoxy polymers, polyester polymers, polyurethane polymers, and others. The polymeric dispersants can be used with organic and inorganic pigments, dyes, and inks. Also, because of its tolerance to aromatic and aliphatic solvents like mineral spirits, naphtha, xylene, toluene, etc., non-polar solvents can be used in the formulation.

As used herein, the term "film-forming polymer" means any polymeric material that can form a film from evaporation of any carrier or solvent, and/or by reacting with a curing agent, e.g., melamine, urea, epoxy, or isocyanate resin.

As used herein, the term styrene is meant to include styrene and the substituted styrenes e.g., alpha-methylstyrene, vinyl toluene, chlorostyrene, and t-butylstyrene. As used in this invention, styrene is present in an amount between about 10% to about 40% by weight in the reaction mixture.

The alkyl methacrylate monomers which are useful in the practice of this invention are typically obtained by the reaction of methacrylic acid and monofunctional alcohols. The alkyl methacrylates contain from 1 to 18 carbon atoms in the alkyl chain. Representative useful methacrylic monomers include methyl methacrylate, ethyl methacrylate, tert-butyl methacrylate, butyl methacrylate, isobutyl methacrylate, propyl methacrylate, isobomyl methacrylate, lauryl methacrylate, 2-ethylhexyl methacrylate, isoamyl methacrylate, hexyl methacrylate, octyl methacrylate, etc. According to this invention, at least one of the alkyl methacrylates must have greater than 8 carbon atoms in the alkyl chain, and more preferably, at least one of the alkyl methacrylates must have at least 10 carbons in the alkyl chain. The combined alkyl methacrylates used in the formation of the polymeric dispersant of this invention is at a level from about 10% to about 55% by weight. Preferably, the alkyl methacrylate monomer having 1 to 8 carbon atoms is from about 10% to about 30% and the alkyl methacrylate monomer having greater than 8 carbon atoms is from about 10% to about 35% of the mixture of monomers. More preferably the combined alkyl methacrylates having 1 to 8 carbon atoms in the alkyl group and alkyl methacrylates having greater than 8 carbon atoms in the alkyl group is from about 30% to about 45% of the mixture of monomers. Most preferably, at least one alkyl methacrylate having greater than 8 carbon atoms in the alkyl chain is present from about 15% to about 25% by weight in the reaction mixture. Although it is not our intent to be bound by theory, it appears that the higher carbon alkyl methacrylates provide increased compatibility to non-polar solvents, and especially provides improved stability of the dispersion in non-aqueous dispersions. The following table summarizes results obtained from compatibility studies using increased amounts of $C_{8+}$ methacrylates.

|  | Resin A | Resin B | Resin C | Resin D |
| --- | --- | --- | --- | --- |
| Styrene | 20.0% | 20.0% | 20.0% | 20.0% |
| Butyl acrylate | 6.1 | 6.1 | 6.1 | 6.1 |
| Hydroxyethylmethacrylate | 15.0 | 15.0 | 15.0 | 15.0 |
| 2-ethylhexylacrylate | 12.3 | 12.3 | 12.3 | 12.3 |
| Dimethylaminoethylacrylate | 5.0 | 5.0 | 5.0 | 5.0 |
| Total alkyl methacrylates | 41.6 | 41.6 | 41.6 | 41.6 |
| $C_{8+}$-methacrylate | 26.6 | 20.0 | 15.0 | 10.0 |
| Total % $C_{8+}$ methacrylate | 63.9 | 48.0 | 36.0 | 24.0 |
| No. of grams of naphtha added to 5 g resin to get turbidity | 9.5 | 5.2 | 3.8 | 2.6 |

The total methacrylate level remained constant in the above examples. Differing amounts of $C_{8+}$ methacrylates were used to show differing compatibilities to non-polar solvents. As can be seen by the above examples, using higher concentrations of $C_{8+}$ methacrylates achieves increased compatibility of the resins to non-polar solvents.

A hardening monomer selected from the group consisting of styrene, alkyl methacrylates (i.e., methyl methacrylate, ethyl methacylate) and mixtures thereof is used in the formation of the dispersion of this invention, at a level of from about 10% to about 60% by weight, preferably from about 35% to about 50% by weight, and more preferably from about 35% to about 45% by weight of the reaction mixture. The combination of styrene and methyl methacrylate are the preferred hardening monomers.

Representative useful alkyl acrylate monomers are typically prepared by the reaction of acrylic acid and monofunctional alcohols. Representative useful monomers include methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, lauryl acrylate, present at a level from about 5% to about 30% by weight of the reaction mixture.

Representative hydroxy-functional ethylenically unsaturated monomers having a molecular weight of less than 2000 which are copolymerizable with the other required monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, caprolactone adducts with 1 to 5 caprolactone units, such as Tone® M100 (trademark of Union Carbide's hydroxy-functional acrylic caprolactone adduct believed to be the reaction product of 1 mole of hydroxyethyl acrylate and 2 moles of caprolactone), para-vinyl benzyl alcohol, etc. At least one hydroxy-functional ethylenically-unsaturated monomer is present at a level from about 7% to about 25% by weight of the reaction mixture.

Another component used in the formation of the polymeric dispersion is a compound capable of providing an amine or amine salt functional moiety. This compound is used at a level ranging from about 0.1% to about 15%, preferably from about 3% to about 10%, of the polymer reaction mixture. The amine salt functional moiety can be provided by an aliphatic or alicyclic amine, and can be primary, secondary, tertiary, or quaternary salts. One source of amine functional moieties is provided by an acrylic or methacrylic compound containing amino groups, e.g., dimethylaminoethyl methacrylate, dimethylaminoethylacrylate, dimethylaminopropyl acrylate, and t-butylaminoethyl acrylate, and t-butylaminoethyl methacrylate.

Especially preferred in the practice of this invention is the use of styrene, methyl methacrylate, butyl acrylate and hydroxyethyl methacrylate, 2-ethylhexylacrylate, isobornyl methacrylate, lauryl methacrylate, and dimethylaminoethylacrylate.

The polymeric dispersant is prepared by polymerizing the monomers under free radical addition polymerization conditions. These conditions typically involve the gradual addition, frequently over a period of several hours, of a mixture of unreacted monomers and free radical initiators into a solvent solution which is generally maintained at a reaction temperatures typically ranging from 75° to 200° C. The reaction mixture is typically "chased" after all the monomer has been added by the addition of additional free radical initiator to ensure more complete polymerization. Suitable polymers can be prepared by conducting the reaction in the presence of an ester or ketone, such as n-butyl acetate or methyl amyl ketone, at temperatures of 110° C. to about 145° C. in the presence of suitable initiators such as t-butyl perbenzoate, or especially t-butyl peroctoate or azobis(2-methylbutyronitrile).

Another convenient process for preparing the polymeric dispersants involves conducting the polymerization reaction at a relatively constant reaction temperature while altering the initiator concentration over the course of the total monomer feed to provide a greater initiator concentration during some of the reaction period. Free radical addition polymers are typically prepared by slowly adding a mixture of unreacted monomers and initiator into a heated vessel. It is generally understood that lower initiator concentrations yield polymers having higher molecular weights.

Useful free radical initiators well known in the art include azobis(2-methylbutyronitrile), dipropyl peroxide, di-t-butyl peroxide, cumene hydroperoxide, t-butyl perbenzoate, t-butyl peroctoate and many others. Especially preferred initiators are t-butyl perbenzoate and, particularly, t-butyl peroctoate, and more particularly, azobis(2-methylbutyronitrile). The total amount of initiator used throughout the reaction will typically be from 0.5 to about 10 percent, and especially 4 to about 9 percent by weight of the total monomer charge. The reaction may be carried out in the presence of the same organic solvents that have been used in the polymerization reaction.

The final polymeric dispersant resins have a number weight average of 2500 to about 10,000, preferably from about 2800 to about 6000, as determined by conventional gel permeation chromatographic methods, using polystyrene as a reference standard. The final polymeric dispersant resins also are substantially free of carboxyl functionality and acid functionality, providing increased resin stability and lower viscosity. The final polymeric dispersant resins have glass transition temperatures in the range of from about −10° C. to 40° C. A resin with glass transition temperature of less than −10° C. will be too soft and could result in softer film; also, a resin with glass transition temperature higher than 50° C. will be too viscous, and could result in a hard, brittle film.

The polymeric dispersants are especially suitable for preparing pigment dispersions by conventional dispersion techniques well known in the art such as roller mills, ball mills, Cowles dissolver, sand mills and others. The pigment is added to the dispersant resin, in the presence of a suitable liquid carrier, which may be a solvent, a reactive diluent or even another polymer so that the pigment dispersion has an appropriate viscosity for grinding and dispersing the pigment and maintaining it in a stable dispersed state. The polymeric dispersants of this invention allow pigments to be more readily dispersed in pigment grinds, without the need to use any other surfactant. A particularly preferred pigment dispersion would comprise:

(i) from about 1 to about 80 percent by weight of a pigment component;

(ii) from about 10 to about 60 percent by weight of the afore described polymeric dispersant; and (iii) the remainder being a suitable liquid carrier, The resultant pigment dispersions provide increased hiding power and tint strength. Pigment components useful herein include those conventionally used in the coatings industry. Representative pigments include white pigments such as titanium dioxide, zinc oxide, antimony oxide, etc. and also include organic or inorganic chromatic pigments such as iron oxide, carbon black, phthalocyanine blue, quinacridone red, perylene violet, lead chromate, silicochromates, barium carbonate, china clay, zinc sulfide, zirconium oxide, antimony oxide, titanium dioxide, chrome green, chrome yellow, thio-indigo red, phthalo blue, pthalo green, cobalt blue, cadmium yellow, cadmium red, toluidine red, graphite, carbon black, metallic aluminum, metallic zinc, etc. As used in this invention, pigment components can also be used in ink formulations. The dispersions may also contain extender pigments such as calcium carbonate, barytes, clay, silica, talc, etc. The dispersions may also contain wetting agents, flow agents, or other additives known in the art. The liquid carrier will typically be a non-aqueous solvent and/or reactive diluent. Due to the polymeric dispersants' compatibility with the film-forming resins and relatively low viscosity and good pigment-wetting characteristics, the amount of liquid carrier used in the pigment dispersions can be reduced. Because of its film-forming properties, the use of a film-forming polymer can be optional. Also, by use of this dispersant resin, frequently no added surfactant is necessary for the pigment dispersion. Because of its wide compatibility, aromatic and aliphatic solvents like mineral spirits, V&M naphtha, xylene, toluene can also be used in the formulation. Suitable solvents include the solvents used in the reaction of the monomers, oxygenated solvents such as esters, ketones, ethers and other materials. Oxygenated solvents such as esters are especially preferred due to their favorable solubility characteristics and compliance with many air pollution restrictions. Solvents such as n-butyl acetate and n-butyl propionate are especially preferred. Suitable reactive diluents include oxazolidines, polyamines, ketimenes, blocked amines (aldimines), orthoesters, and polyols which would be reactive with any incorporated crosslinking agents. The pigment dispersions can contain other additives commonly used in pigment dispersions, for example, plasticizers, wetting agents, defoamers, diluents, and flow control agents.

Coating compositions of the present invention are formulated using the polymeric dispersant, a film forming polymer, and optionally a pigment dispersion. The film forming polymer can be an alkyd, acrylic, urethane, polyester, or non-aqueous dispersion. Optionally, a crosslinker which is reactive with both the dispersant and the film-forming polymer is used, if desired. Typical crosslinking agents used in the coating compositions can be polyanhydrides, polyisocyanates, which may be blocked amino resins such as ureas, melamines or polyepoxides, etc.

Surface coating compositions of this invention comprise from about 2% to about 40%, preferably from about 5% to about 20% by weight of the polymeric dispersant of this invention, from about 5 to 70% suitable film-forming resin, and from about 5% to about 50% of the liquid carrier, and optionally from about 1% to about 80% of a pigment component. Also, due to the dispersant's ability to also act as a film former, the dispersant may be added in excess greater than 50% by weight. The coating compositions of this invention can also contain solvents, reactive diluents, flow agents, ultra-violet light absorbers, antioxidants, catalysts, etc. The coating compositions could typically be applied to any substrate such as metal, plastic, wood, glass, synthetic fibers, paper, etc. by brushing, dipping, roll coating, flow coating, spraying or other method conventionally employed in the coating industry. The curable coatings can typically be cured at temperatures ranging from about room temperature to about 300° F. for polyisocyanate and polyanhydride crosslinked materials, and at temperatures ranging from about 200° F. to about 350° F. for amino resin crosslinked materials.

The polymeric dispersants of this invention can also be used as a compatibilizer to aid in the blending of at least two incompatible polymers. The term "compatibilizer" is intended to mean an aid to improving the miscibility of two mutually incompatible polymers. The term "incompatible polymers" is meant to include combinations of polymers that are relatively immiscible, that is, forms a cloudy solution and/or cloudy dry film or complete phase separation when mixed. Incompatible polymers also include those that have partial compatibility with each other. For example, if resin A and resin B are incompatible when mixed together, the addition of the polymeric dispersant of this invention can act to aid in the compatibility of the mixture, providing a stable polymer blend for prolonged periods without phase separation. Typically, the dispersant can be added in an effective amount to at least one of the incompatible polymers, then the remaining polymer(s) can be combined and mixed properly to form a stable polymer blend. The following illustrates the dispersant resin of Example 2 used in solution and film with incompatible polymers.

COMPATIBILITY OF EXAMPLE 2 DISPERSANT RESIN IN SOLUTION

| Resin Description | Monomer Modified Soya Alkyd | | Hydroxy Polyol | |
| --- | --- | --- | --- | --- |
| | 1:1 Solution | 1:1:1 w/D.R. | 1:1 Solution | 1:1:1 w/D.R. |
| Non-functional Acrylic | Phase Separate | Hazy | Clear | Clear |
| Hydroxy-functional Acrylic | Phase Separate | Hazy | Clear | Clear |
| Medium Oil Sunflower Alkyd | Phase Separate | Hazy | Phase Separate | Hazy |

COMPATIBILITY OF EXAMPLE 2 DISPERSANT RESIN WITH DRAW-DOWN FILM

| Resin Description | Monomer Modified Soya Alkyd | | Hydroxy Polyol | |
| --- | --- | --- | --- | --- |
| | 1:1 Mixture | 1:1:1 w/D.R. | 1:1 Mixture | 1:1:1 w/D.R. |
| Non-functional Acrylic | Hazy | Clear | Hazy | Clear |
| Hydroxy-functional Acrylic | Phase Separate | Hazy | Clear | Clear |
| Medium Oil Sunflower Alkyd | Severe Phase Separate | Phase Separate | Hazy | Clear |

COMPARISON OF EXAMPLE 2 DISPERSANT RESIN WITH COMMERCIALLY AVAILABLE TONER

The dispersant resin from Example 2 of this invention is compared with a formula made using the commercially available dispersion, HULS 844-9959 jet black dispersion, available from Huls America, Inc. Turner Place, P.O. Box 365, Piscataway, N.J. 08855. The tint strength, viscosity, and tack free time were compared:

|  | Paint Formulation 1 using HULS 844–9959 jet black dispersion | Paint Formulation 2 using dispersion resin from Example 2 |
|---|---|---|
| Pigment | Raven 5000 | Raven 5000 |
| PVC | 1.08 | 1.08 |
| NVM (%) | 57.95 | 57.91 |
| Resin Vol. Solids (%) | 49.58 | 49.06 |
| Resin Wt. Solids (%) | 56.97 | 56.94 |
| Pigment (g/100 g Paint) (Raven 5000) | 0.98 | 0.97 |
| Tint Strength | Control | +28.3% |
| Viscosity (Cps) | 400 | 280 |
| KPH (24 hr) | 26 | 38 |
| Tack Free Time (hrs) | 5.4 | 3.5 |

Thus, at a lower viscosity and same percent solids, the dispersion resins of this invention have a higher tint strength, as measured by conventional spectrophotometric methods.

COMPARISON OF DISPERSANT RESIN IN VARIOUS FILM-FORMING RESINS

The dispersant resins of this invention are also compared for compatibility in polar and non-polar solutions and compatibility in dry film. Compatibility is determined by using the dispersant resin mixed in various proportions with other resins. Specifically, the dispersant resin was mixed with non-aqueous dispersions, alkyd resins, acrylic resins, IPDI isocyanate trimer, and HMDI-based polyisocyanate in 5:95, 15:85, 50:50, 35:15, and 95:15 proportions. The resins were mixed in a vial and shaken for 10 to 15 minutes and observed for clarity. Its compatibility as drawn down film is also compared.

DISPERSANT RESIN FROM EXAMPLE 2: COMPATIBILITY IN SOLUTION

| RESIN | 5:95 | 15:85 | 50:50 | 85:15 | 95:5 |
|---|---|---|---|---|---|
| Alkyd (long oil soya) | Clear | Clear | Clear | Clear | Slight Haze |
| Alkyd (Medium oil sunflower) | Clear | Clear | Clear | Clear | Slight Haze |
| Monomer Modified Alkyd | Clear | Clear | Hazy | Hazy | Hazy |
| IPDI Polyisocyanate | Clear | Clear | Clear | Clear | Clear |
| HMDI Polyisocyanate | Clear | Clear | Clear | Clear | Clear |

DISPERSANT RESIN FROM EXAMPLE 2: COMPATIBILITY IN FILM

| Resin | 5:95 | 15:85 | 50:50 | 85:15 | 95:5 |
|---|---|---|---|---|---|
| NAD | Clear | Clear | Slight Haze | Slight Haze | Clear |
| Alkyd (Long oil soya) | Clear | Clear | Clear | Clear | Clear |
| Alkyd (Medium oil sunflower) | Clear | Clear | Clear | Clear | Clear |
| Monomer Modified Alkyd | Clear | Clear | Hazy | Hazy | Clear |
| IPDI Polyisocyanate | Clear | Clear | Clear | Clear | Clear |
| HMDI Polyisocyanate | Clear | Clear | Clear but Slight Wrinkles | Clear but Slight Wrinkles | Clear |

The dispersant resin of this invention also provides a lower viscosity, increased initial hardness, requires decreased drying time, increased flexibility as compared to the commercially available Huls dispersant.

The following examples have been selected to illustrate specific embodiments and practices of advantage to a more complete understanding of the invention. Unless otherwise stated, "parts" means parts-by-weight and "percent" is percent-by-weight.

EXAMPLE 1

One thousand one hundred forty nine parts of methyl amyl ketone was charged to a polymerization reactor, fitted with a mechanical stirrer, a water cooled condenser, a nitrogen inlet, thermometer, a heating mantle, and a fluid metering pump. The solvent was heated to 110° C. Next, a monomer/initiator mixture of 460 parts styrene, 345 parts methyl methacrylate, 115 pads of butyl acrylate, 345 parts of hydroxy ethyl methacrylate, 345 parts of isobornyl methacrylate, 575 parts of lauryl methacrylate, 115 parts of dimethylaminoethyl acrylate, and 161 parts of 2,2'-azobis-(2-methylbutyronitrile) was metered into the reaction vessel at a constant rate over a three hour time period. The reaction temperature was held at 110° C. for 15 minutes after completing the monomer/initiator addition. Next, 23 parts 2,2'-azobis(2-methylbutyronitrile) and 90 parts of methyl amyl ketone was added over a 90 minute time period. The reaction was then held at 110° C. for additional 30 minutes. The reaction mixture was allowed to cool to room temperature which yielded a hydroxy-functional polymer with a number average molecular weight of 3000, weight average molecular weight of 5900 and a polydispersity of 2.0. The theoretical hydroxyl equivalent weight was calculated to be 867. The percent nonvolatile solids was 64.1% at (150° C. for 1 hour). Viscosities were Brookfield of 1230 cps (RVT, spindle #4,20 rpm), and Gardner Holdt V+. Gardner Holdt color and clarity were 0–1 and clear. The weight per gallon was 8.14.

EXAMPLE 2

Five hundred twenty nine parts of n-butyl acetate was charged to a polymerization reactor, fitted with a mechanical stirrer, a water cooled jacket, a nitrogen inlet, thermometer, a heating jacket, and a fluid metering pump. The solvent was heated to 125° C. Next, a monomer mixture of 327.5 parts styrene, 244.6 parts methyl methacrylate, 85.8 parts of butyl acrylate, 214.5 parts of hydroxy ethyl methacrylate, 225.9 parts of 2-ethyl hexyl acrylate, 45.8 parts of isobornyl methacrylate, 214.5 parts of lauryl methacrylate, and 71.5 parts of dimethylaminoethyl acrylate was metered into the reaction vessel at a constant rate over a three hour time period. Simultaneously, a mixture of 78.6 parts of 2,2'- azobis(2-methylbutyronitrile) and 166.9 parts of n-butyl acetate was metered into the reaction vessel at a constant rate over a three hour time period. The reaction temperature was held at 125° C. for 15 minutes after completing the monomer and initiator addition. Next, 14.3 parts 2,2'-azobis-(2-methylbutyronitrile) and 33.3 parts of n-butyl acetate was added over a 90 minute time period. Monomer and initiator containers were flushed with 40.6 parts of n-butyl acetate and solvent was added to reactor. The reaction was then held at 125° C. for additional 30 minutes. The reaction mixture was allowed to cool to room temperature which yielded a hydroxy-functional polymer with a number average molecular weight of 3400, weight average molecular weight of 6900 and a polydispersity of 2.0. The theoretical hydroxyl equivalent weight was calculated to be 867. The percent nonvolatile solids was 64.8% at (150° C. for 1 hour). Viscosities were Brookfield of 1120 cps (RVT, spindle #4, 20 rpm), and Gardner Holdt U-V. Gardner Holdt color and clarity were 0–1 and clear. The weight per gallon was 8.38.

EXAMPLE 3

Seven hundred parts of n-butyl acetate was charged to a polymerization reactor, fitted with a mechanical stirrer, a water cooled condenser, a nitrogen inlet, thermometer, a heating mantle, and a fluid metering pump. The solvent was heated to 110° C. Next, a monomer/initiator mixture of 327.5 parts styrene, 244.5 parts methyl methacrylate, 85.8 parts of butyl acrylate, 214.5 parts of hydroxy ethyl methacrylate, 188.76 parts of 2-ethyl hexyl acrylate, 82.94 parts of isobornyl methacrylate, 214.5 parts of lauryl methacrylate, 71.5 parts of dimethylaminoethyl acrylate, and 100.1 parts of 2,2'-azobis(2-methylbutyronitrile) was metered into the reaction vessel at a constant rate over a three hour time period. The reaction temperature was held at 110° C. for 15 minutes after completing the monomer/initiator addition. Next, 14.3 parts 2,2'-azobis(2-methylbutyronitrile) and 70 parts of n-butyl acetate was added over a 90 minute time period. The reaction was then held at 110° C. for additional 30 minutes. The reaction mixture was allowed to cool to room temperature which yielded a hydroxy-functional polymer with a number average molecular weight of 3350, weight average molecular weight of 6600 and a polydispersity of 2.0. The theoretical hydroxyl equivalent weight was calculated to be 867. The percent nonvolatile solids was 64.4% at (150° C. for 1 hour). Viscosities were Brookfield of 1070 cps (RVT, spindle #4, 20 rpm), and Gardner Holdt V–. Gardner Holdt color and clarity were 0–1 and clear. The weight per gallon was 8.37.

EXAMPLE 4

Seven hundred parts of n-butyl acetate was charged to a polymerization reactor, fitted with a mechanical stirrer, a water cooled condenser, a nitrogen inlet, thermometer, a heating mantle, and a fluid metering pump. The solvent was heated to 110° C. Next, a monomer/initiator mixture of 327.5 parts styrene, 244.5 parts methyl methacrylate, 85.8 parts of butyl acrylate, 214.5 parts of hydroxy ethyl methacrylate, 151.6 parts of 2-ethyl hexyl acrylate, 120.1 parts of isobornyl methacrylate, 214.5 parts of lauryl methacrylate, 71.5 parts of dimethylaminoethyl acrylate, and 100.1 parts of 2,2'-azobis-(2-methylbutyronitrile) was metered into the reaction vessel at a constant rate over a three hour time period. The reaction temperature was held at 110° C. for 15 minutes after completing the monomer/initiator addition. Next, 14.3 parts 2,2'-azobis-(2-methylbutyronitrile) and 70 parts of n-butyl acetate was added over a 90 minute time period. The reaction was then held at 110° C. for additional 30 minutes. The reaction mixture was allowed to cool to room temperature which yielded a hydroxy-functional polymer with a number average molecular weight of 3300, weight average molecular weight of 6600 and a polydispersity of 2.0. The theoretical hydroxyl equivalent weight was calculated to be 867. The percent nonvolatile solids was 65.0% at (150° C. for 1 hour). Viscosities were Brookfield of 1070 cps (RVT, spindle #4, 20 rpm), and Gardner Holdt V-W. Gardner Holdt color and clarity were 0–1 and clear. The weight per gallon was 8.37.

EXAMPLE 5

Seven hundred parts of n-butyl acetate was charged to a polymerization reactor, fitted with a mechanical stirrer, a water cooled condenser, a nitrogen inlet, thermometer, a heating mantle, and a fluid metering pump. The solvent was heated to 110° C. Next, a monomer/initiator mixture of 327.5 parts styrene, 244.5 parts methyl methacrylate, 85.8 parts of butyl acrylate, 214.5 parts of hydroxy ethyl methacrylate, 266.0 parts of 2-ethyl hexyl acrylate, 5.7 parts of isobornyl methacrylate, 214.5 parts of lauryl methacrylate, 71.5 parts of dimethylaminoethyl acrylate, and 100.1 parts of 2,2'-azobis(2-methylbutyronitrile) was metered into the reaction vessel at a constant rate over a three hour time period. The reaction temperature was held at 11° C. for 15 minutes after completing the monomer/initiator addition. Next, 14.3 parts 2,2'-azobis(2-methylbutyronitrile) and 70 parts of n-butyl acetate was added over a 90 minute time period. The reaction was then held at 110° C. for additional 30 minutes. The reaction mixture was allowed to cool to room temperature which yielded a hydroxy-functional polymer with theoretical hydroxyl equivalent weight to be 867. The percent nonvolatile solids was 64.2% at (150° C. for 1 hour). Viscosities were Brookfield of 790 cps (RVT, spindle #4, 20 rpm), and Gardner Holdt V–. Gardner Holdt color and clarity were 0–1 and clear. The weight per gallon was 8.34.

EXAMPLE 6

Seven hundred parts of n-butyl acetate was charged to a polymerization reactor, fitted with a mechanical stirrer, a water cooled condenser, a nitrogen inlet, thermometer, a heating mantle, and a fluid metering pump. The solvent was heated to 110° C. Next, a monomer/initiator mixture of 214.5 parts styrene, 286.0 parts methyl methacrylate, 85.8 parts of butyl acrylate, 214.5 parts of hydroxy ethyl methacrylate, 251.4 parts of 2-ethyl hexyl acrylate, 157.3 parts of isobornyl methacrylate, 143.0 parts of lauryl methacrylate, 71.5 parts of dimethylaminoethyl acrylate, and 100.1 parts of 2,2'-azobis(2-methylbutyronitrile) was metered into the reaction vessel at a constant rate over a three hour time period. The reaction temperature was held at 110° C. for 15 minutes after completing the monomer/initiator addition. Next, 14.3 parts 2,2'-azobis(2-methylbutyronitrile) and 70 parts of n-butyl acetate was added over a 90 minute time period. The reaction was then held at 110° C. for additional 30 minutes. The reaction mixture was allowed to cool to room temperature which yielded a hydroxy-functional polymer with theoretical hydroxyl equivalent weight calculated to be 867. The percent nonvolatile solids was 65.3% at (150° C. for 1 hour). Viscosity by Gardner Holdt U-V. Gardner Holdt color and clarity were 0–1 and clear. The weight per gallon was 8.40.

EXAMPLE 7

Seven hundred parts of n-butyl acetate was charged to a polymerization reactor, fitted with a mechanical stirrer, a water cooled condenser, a nitrogen inlet, thermometer, a heating mantle, and a fluid metering pump. The solvent was heated to 110° C. Next, a monomer/initiator mixture of 286.0 parts styrene, 214.5 parts methyl methacrylate, 87.2 parts of butyl acrylate, 214.5 parts of hydroxy ethyl methacrylate, 175.9 parts of 2-ethyl hexyl acrylate, 94.4 parts of isobornyl methacrylate, 286.0 parts of lauryl methacrylate, 71.5 parts of dimethylaminoethyl acrylate, and 100.1 parts of 2,2'-azobis(2-methylbutyronitrile) was metered into the reaction vessel at a constant rate over a three hour time period. The reaction temperature was held at 110° C. for 15 minutes after completing the monomer/initiator addition. Next, 14.3 parts 2,2'-azobis(2-methylbutyronitrile) and 70 parts of n-butyl acetate was added over a 90 minute time period. The reaction was then held at 110° C. for additional 30 minutes. The reaction mixture was allowed to cool to room temperature which yielded a hydroxy-functional polymer with theoretical hydroxyl equivalent weight calculated to be 867. The percent nonvolatile solids was 65.0% at (150° C. for 1 hour). Viscosity by Gardner Holdt U+. Gardner Holdt color and clarity were 0–1 and clear. The weight per gallon was 8.33.

Example

Black Dispersion

Black dispersion was prepared using the following formula using a shaker mill with 3 millimeter steel balls.

Formula:

| | |
|---|---|
| Black Pigment (Raven 5000) | 17.0g |
| Dispersant Resin | 65.4g |
| MAK | 17.6g |
| Steel balls (3 mm diameter) | 400.0g |

The mill base was shaken for one hour in the shaker mill. Rheology profile was measured using a Bohlin Rheometer.

Ability to provide a stable high quality dispersion is determined by rheology profile of the mill base formulation. A lower and Newtonian viscosity dispersion shows the ability of the dispersant to provide a stable, compatible dispersion. The following table shows rheology profiles of dispersions in the above Examples as compared to a Resin "A", a non-amine containing resin having the following composition:

| Resin "A": | |
|---|---|
| Monomer | % by Weight |
| Styrene | 20 |
| Methyl methacrylate | 15 |
| Hydroxyethyl methacrylate | 15 |
| Butyl acrylate | 10 |
| >C8 Methacrylate | 40 |

| | Viscosity of Black Dispersion (cps) | | |
|---|---|---|---|
| Resin | at shear rate 0.4 (1/s) | at shear rate 15 (1/s) | at shear rate 1160 (1/s) |
| Example 1 | 518 | 527 | 447 |
| Example 2 | 472 | 467 | 351 |
| Example 3 | 537 | 568 | 385 |
| Example 4 | 448 | 514 | 387 |
| Example 5 | 677 | 645 | 454 |
| Example 7 | 622 | 588 | 472 |
| Resin "A" | 14,110 | 5,393 | 447 |

It can be seen that the Example 2 resin above shows overall lowest viscosity and Newtonian flow. Resin "A", which does not have an amine monomer, shows the most undesirable characteristics.

Example

White Dispersion

A white dispersion was prepared by dispersing 116.1 parts dispersant resin from Example 2, 107.8 parts isobutyl isobutyrate, and 895.5 parts rutile titanium dioxide on a high speed disperser until a 7H grind is obtained. An additional 166.6 parts of dispersant resin and 30.9 parts of isobutyl isobutyrate was then added to stabilize the mixture.

While this invention has been described by a specific number of embodiments, other variations and modifications may be made without departing from the spirit and scope of the invention as set forth in the appended claims.

If The entire disclosures of all applications, patents, and publications cited herein are hereby incorporated by reference.

The invention claimed is:

1. An ink composition, said ink composition comprising a polymeric dispersant, said dispersant is a polymerization reaction product of a mixture of monomers consisting essentially of:
    (a) from about 10% to about 40% by weight styrene; and
    (b) from about 10% to about 55% by weight of at least one alkyl methacrylate monomer having 1 to 8 carbon atoms in the alkyl group; and
    (c) from about 10% to about 55% by weight of at least one alkyl methacrylate monomer having greater than 8 carbon atoms in the alkyl group; and
    (d) from about 5% to about 25% by weight of at least one alkyl acrylate monomer having from 1 to 18 carbon atoms in the alkyl group; and
    (e) from about 7% to about 25% by weight of at least one hydroxy-functional ethylenically unsaturated monomer having a molecular weight of less than 2000; and
    (f) from about 0.1% to about 15% of a compound providing an amine functional moiety, said compound being an acrylate or methacrylate compound containing amino groups, copolymerizable with (a), (b), (c), (d), and (e); wherein the dispersant is substantially free of acid functionality.

2. The ink composition of claim 1, wherein the alkyl methacrylate monomer having 1 to 8 carbon atoms is from about 10% to about 30% and the allyl methacrylate monomer having greater than 8 carbon atoms is from about 10% to about 35% of the mixture of monomers.

3. The ink composition of claim 1, wherein the combined alkyl methacrylates having 1 to 8 carbon atoms in the alkyl group and alkyl methacrylates having greater than 8 carbon atoms in the alkyl group is from about 30% to about 45% of the mixture of monomers.

4. The ink composition of claim 1, wherein the alkyl methacrylate having greater than 8 carbon atoms in the alkyl group is from about 15% to about 25% of the mixture of monomers.

5. The ink composition of claim 1, wherein the at least one alkyl methacrylate is selected from the group consisting of methyl methacrylate, ethyl methacrylate, tert-butyl methacrylate, butyl methacrylate, isobutyl methacrylate, propyl methacrylate, isobornyl methacrylate, lauryl methacrylate, 2-ethylhexyl methacrylate, isoamyl methacrylate, hexyl methacrylate, and octyl methacrylate.

6. The ink composition of claim 1, wherein the styrene is selected from the group consisting of styrene alpha-methylstyrene, vinyl toluene, chlorostyrene, and t-butylstyrene.

7. The ink composition of claim 1, wherein the at least one of at least one hydroxy-functional ethylenically unsaturated monomer is selected from the group consisting of 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, and caprolactone adducts with 1 to 5 caprolactone units.

8. The ink composition of claim 1, wherein the amine functional moiety is selected from the group consisting of dimethylaminoethyl methacrylate, dimethylaminoethylacrylate, dimethylaminopropyl acrylate, and t-butylaminoethyl acrylate, and t-butylaminoethyl methacrylate.

9. The ink composition of claim 1, wherein at least one alkyl methacrylate is lauryl methacrylate.

* * * * *